UNITED STATES PATENT OFFICE.

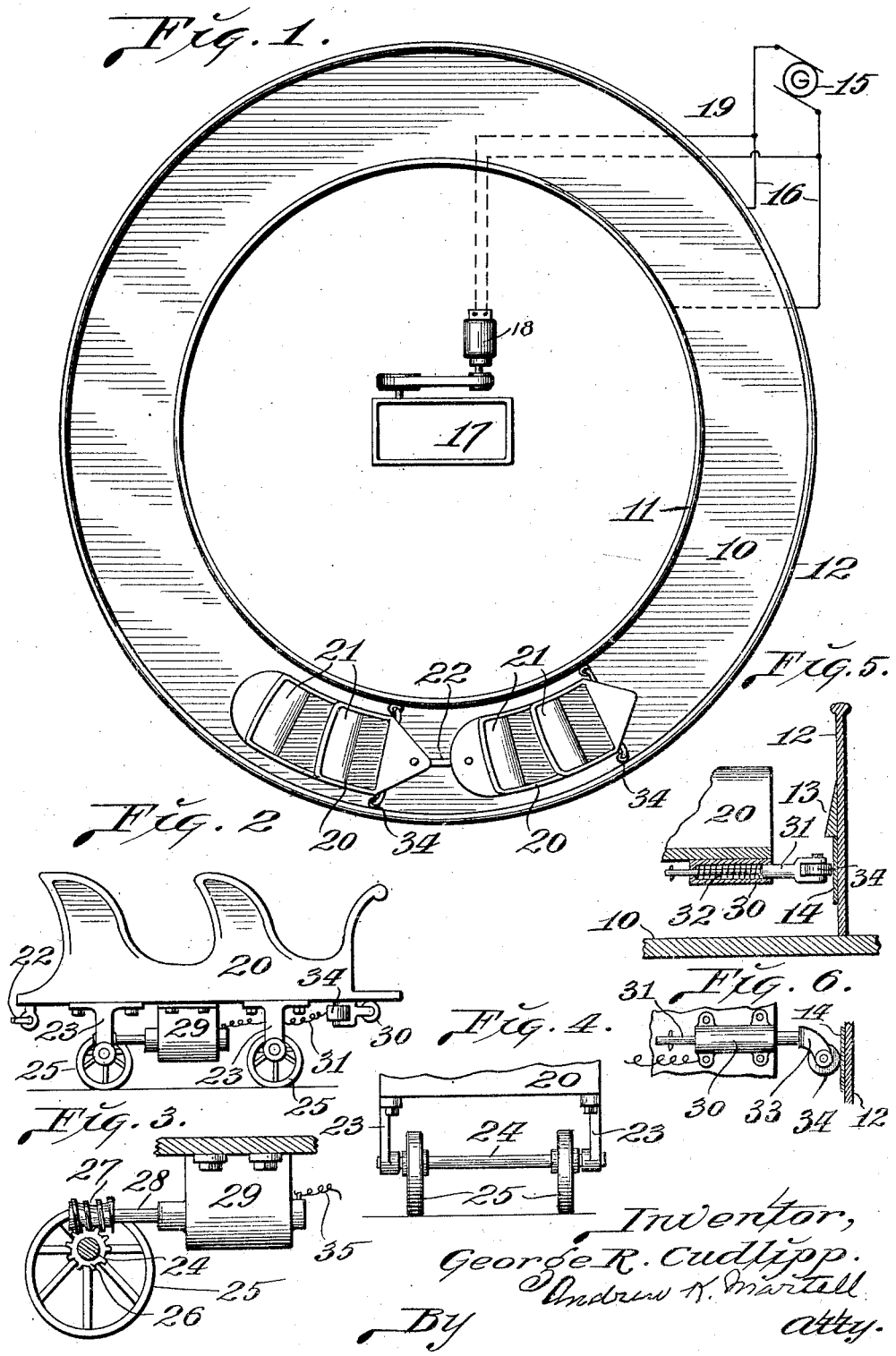

GEORGE R. CUDLIPP, OF LOS ANGELES, CALIFORNIA, ASSIGNOR TO SUNSHINE AMUSEMENT AND PROPERTIES CO., OF LOS ANGELES, CALIFORNIA, A CORPORATION OF CALIFORNIA.

AMUSEMENT DEVICE.

1,400,497.  Specification of Letters Patent.  Patented Dec. 13, 1921.

Application filed May 18, 1921. Serial No. 470,497.

*To all whom it may concern:*

Be it known that I, GEORGE R. CUDLIPP, a subject of the King of Great Britain, residing in Los Angeles, county of Los Angeles, and State of California, have invented a new and useful Amusement Device, of which the following is a specification.

My invention relates to an amusement device in the nature of a merry-go-round, the principal objects of my invention being to generally improve upon the existing forms of similar amusement devices, to provide a relatively simple and practical construction wherein passenger carrying cars or vehicles are arranged for operation upon a circular track, to provide simple and efficient means for propelling the cars around the track and further, to mount the cars so that they will be given an undulatory or wave like motion as they move forward over the track and which movement is preferably accomplished by equipping the cars with eccentrically mounted traction wheels.

With the foregoing and other objects in view, my invention consists in certain novel features of construction and arrangement of parts that will be hereinafter more freely set forth, pointed out in my claim and illustrated in the accompanying drawings in which:

Figure 1 is a plan view of a merry-go-round amusement device constructed in accordance with my invention.

Fig. 2 is a side elevational view of one of the cars that forms a part of the device.

Fig. 3 is a detail section showing the driving connection from the motor to one of the wheel carrying axles.

Fig. 4 is an elevational view of one of the axles and showing the eccentrically mounted wheels thereupon.

Fig. 5 is a detail section showing one of the passenger car guiding wheels, and a current carrying plate with which said wheel makes contact.

Fig. 6 is a plan view looking against the underside of one of the car guiding wheels.

Referring by numerals to the accompanying drawings which illustrates a practical embodiment of my invention 10 designates a circular track or pathway that is adapted to be traversed by the cars or vehicles of the device and arranged at the sides of said track are concentrically disposed inner and outer car guiding and retaining walls 11 and 12.

Arranged on the inner faces of these walls and preferably below protecting rails, such as 13, are continuous plates 14 that serve as conductors for electric current and which latter is received from a suitable source of supply such as a generator 15, through suitable conductors 16.

If desired a musical instrument, such as a mechanically played piano or organ 17 may be located in the space within the track and said instrument being operated by means of an electric motor 18 that receives current from the generator through conductors 19.

The cars 20 that form a part of my improved amusement device may be of any desired size and form though preferably provided with two or more transverse seats 21 and two or more of the cars may be coupled together by suitable links or bars, such as 22.

Depending from the body of the car are pairs of bearings 23 and journaled therein are the ends of axles 24. Fixed to each axle and eccentrically arranged thereupon is a pair of traction wheels 25. The wheels of each pair may occupy the same relative positions with respect to each other and to the axle as shown in Figs. 2 and 4, or the members of each pair of wheels may be reversely or oppositely disposed with respect to each other and to the axle upon which they are mounted, in which latter event the car will be given a lateral rocking movement, simultaneous with its undulatory or wave like movement.

Further, if desired the front wheels may be oppositely or reversely positioned with respect to the rear wheels.

Fixed on one of the axles 24 is a worm wheel 26 and engaging therewith is a worm 27 that is carried by the shaft 28 of an electric motor 29 and the latter being mounted on the under side of car body 20. Secured to the under side of the car body and preferably near the front thereof are tubular housings 30 and arranged for sliding movement in each housing is a rod 31 that is normally forced outwardly under the influence of an expansive spring 32.

The outer end of each rod carries a horizontally disposed rearwardly curved fork or yoke 33 and journaled in the latter is a metal roller 34.

Any suitable means may be employed for delivering current to the motor 29, although I prefer to utilize the car guiding means comprising the roller carrying rods 31 and to this end said rods are arranged so that the rollers carried by their outer ends bear directly upon the current carrying plates 14, and the terminals of the motor are connected to the rods 31 through suitable conductors 35 that lead to the housings 30. Thus through conductors 16, plates 14, rollers 34, rods 31, housings 30 and conductors 35 motor is in circuit with generator 15 and the motor is operated, the rotary motion of its shaft is transmitted to the car driving axle through worm 27 and worm wheel 26. Thus the car will be driven forwardly around the circular track and while so driven the car body will be rocked vertically, as a result of the eccentric arrangement of the wheels upon their axles.

In addition to serving as current collecting and carrying members, the wheels 34 mounted in the yokes 33 perform the functions of caster wheels to bear laterally against the walls to the sides of the track and consequently guiding the cars during their forward travel.

A merry-go-round embodying my invention is relatively simple in structure, may be easily and cheaply produced and as the cars have an undulatory or wave like motion simultaneous with their forward movement, a novel and pleasing amusement device is provided. While I have shown and described a relatively simple and practical form of apparatus for imparting undulatory movement to the cars while in motion, it will be understood that I do not limit myself to the specific form herein shown and described, and that minor changes in the size, form and construction of the various parts of my amusement device may be made and substituted for those herein set forth without departing from the spirit of my invention, the scope of which is set forth in the appended claim.

I claim as my invention.

In an amusement device a track having side walls, a motor driven car arranged for operation on said track, caster wheels projecting laterally from said car and adapted to engage said side walls, and eccentrically mounted rolling supports on said car.

Signed at Los Angeles, California, this 27th day of April, 1921.

GEORGE R. CUDLIPP.